(12) United States Patent
Oja et al.

(10) Patent No.: US 6,513,388 B1
(45) Date of Patent: Feb. 4, 2003

(54) MICROMECHANICAL PRECISION SILICON SCALE

(75) Inventors: Aarne Oja, Espoo (FI); Heikki Seppä, Helsinki (FI); Teuvo Sillanpää, Helsinki (FI)

(73) Assignee: Valtion Teknillinen Tutkimuskeskus (FI)

( * ) Notice: Subject to any disclaimer, the term of this patent is extended or adjusted under 35 U.S.C. 154(b) by 0 days.

(21) Appl. No.: 09/720,112

(22) PCT Filed: Jun. 18, 1999

(86) PCT No.: PCT/FI99/00538

§ 371 (c)(1),
(2), (4) Date: Dec. 21, 2000

(87) PCT Pub. No.: WO99/67605

PCT Pub. Date: Dec. 29, 1999

(30) Foreign Application Priority Data

Jun. 24, 1998 (FI) .................................................. 981458
Dec. 30, 1998 (FI) .................................................. 982832

(51) Int. Cl.⁷ .................................................. G01B 7/16
(52) U.S. Cl. ...................................................... 73/777
(58) Field of Search ........................... 73/777, 862.623, 73/514.35, 514.32, 514.18, 862.64, 510, 517 A, 780; 177/25, 210 C

(56) References Cited

U.S. PATENT DOCUMENTS

| 4,679,643 A |   | 7/1987  | Bove                      |
|-------------|---|---------|---------------------------|
| 4,738,324 A |   | 4/1988  | Borchard                  |
| 4,960,177 A |   | 10/1990 | Holm-Kennedy et al.       |
| 5,291,534 A | * | 3/1994  | Sakurai et al. ... 327/509 |
| 5,473,945 A | * | 12/1995 | Grieff et al. ...... 73/510 |
| 5,531,128 A |   | 7/1996  | Ryhanen                   |
| 5,641,911 A | * | 6/1997  | Ryhanen ........... 73/715 |
| 5,684,276 A |   | 11/1997 | Altemir                   |
| 6,079,282 A | * | 6/2000  | Lanter ............ 73/780 |

FOREIGN PATENT DOCUMENTS

DE           3426165           4/1985

* cited by examiner

*Primary Examiner*—Max Noori
(74) *Attorney, Agent, or Firm*—Birch, Stewart, Kolasch & Birch, LLP

(57) ABSTRACT

The invention concerns a silicon micromechanical weight sensor (26). According to the invention, the weight sensor comprises at least two conducting electrodes (2, 15) displaced at a distance from each other, whereby one of the elastically suspended electrode surfaces (2) or, alternatively, a structure connected thereto, acts as the pan surface of the weight sensor.

7 Claims, 1 Drawing Sheet

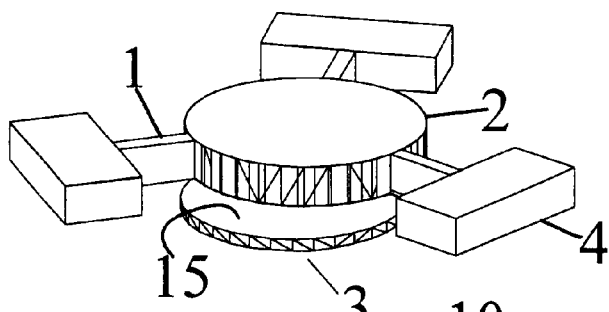
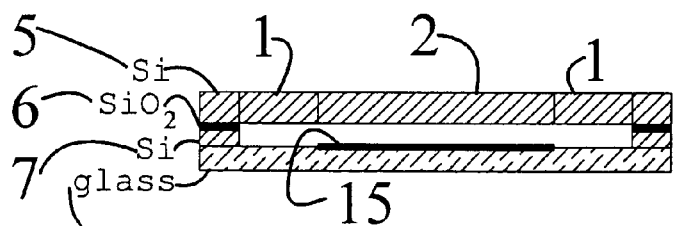
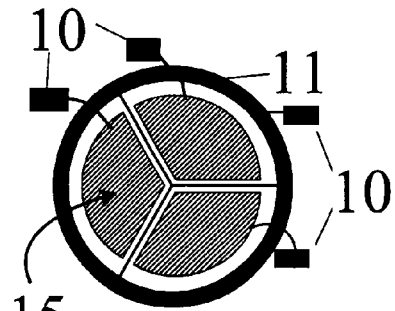
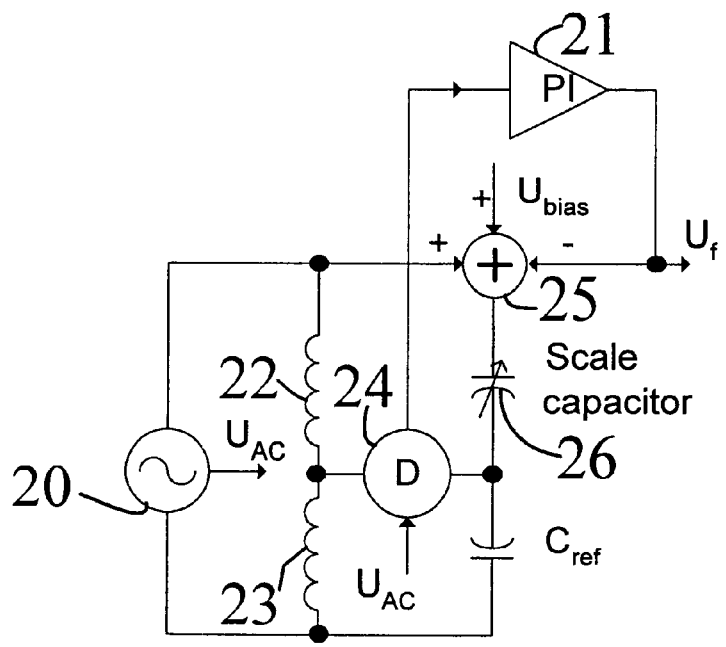

MICROMECHANICAL PRECISION SILICON SCALE

This application is the national phase under 35 U.S.C. §371 of PCT International Application No. PCT/FI99/00538 which has an International filing date of Jun. 18, 1999, which designated the United States of America.

BACKGROUND OF THE INVENTION

The invention concerns a silicon micromechanical weight sensor.

DISCUSSION OF BACKGROUND

Weight sensors fabricated by silicon micromechanical techniques for gauging static gravitational force have not been disclosed in the prior art. Other types of miniature weight sensor structures suffer from instability problems caused by such factors as, e.g., the long-term instability of the mechanical or electrical construction of the sensor.

SUMMARY OF THE INVENTION

It is an object of the present invention to overcome the disadvantages of the above-mentioned prior art and to provide an entirely novel type of silicon micromechanical weight sensor.

The goal of the invention is achieved by virtue of fabricating a capacitive weight sensor by micromechanical processes from monocrystalline silicon. Particularly advantageously at least the spring element of the weight sensor is made from monocrystalline silicon.

More specifically, a silicon micromechanical weight sensor according to the invention is characterized by what is stated in the characterizing part of claim 1.

The invention provides significant benefits.

A capacitive weight sensor based on micromechanical machining from monocrystalline silicon offers an advantageous construction owing to its highly stable structural properties, small size and low production costs. It may be proved by computations means that a weight sensor according to the invention can weigh a mass of one gram with an accuracy of one millionth part per gram, and even better.

The invention provides important practical benefits stemming from its capability of weighing very low masses and the novel measurement method used therein.

Furthermore, the disturbing effect of external vibrations is eliminated by a relatively high mechanical resonant frequency and use of force feedback applied on the sensor electrodes.

BRIEF DESCRIPTION OF THE DRAWINGS

In the following, the invention will be examined in greater detail with the help of exemplifying embodiments illustrated in the appended drawings, in which FIG. 1a shows a perspective view of a silicon micromechanical weight sensor according to the invention;

FIG. 1b shows a longitudinally sectioned side view of the weight sensor of FIG. 1a;

FIG. 1c shows a top view of the electrode structure used in the weight sensor of FIG. 1a; and FIG. 2 shows an embodiment of measurement electronics according to the invention suitable for use in conjunction with a silicon micromechanical weight sensor according to the invention.

DETAILED DESCRIPTION OF THE PREFERRED EMBODIMENTS

This application publication discloses an embodiment of silicon micromachined weight sensor capable of weighing masses in the order of one gram. The mass to be weighed causes a displacement of an elastically suspended plate, whose position is sensed by measuring the capacitance between said plate and another electrode. Thus, the sensor links the mass and electrical quantities with each other via conventional material parameters.

Monocrystalline silicon offers ideal mechanical properties. In particular, the purely elastic range of its structural yield curve is wide. There is also good evidence to the assumption that the values of elastic constants in silicon change by an extremely minimal amount with the aging of this material. Hence, silicon forms a very good material for applications in which elastic forces are balanced against a force to be measured such as gravitation or an electrostatic force. A plurality of different mechanical structures can be made from silicon using etching techniques applied in the semiconductor industry.

FIG. 1a shows a perspective view of a weight sensor according to the invention fabricated by silicon micromechanical methods. An upper electrode 2 is made from silicon to a thickness t=500 $\mu$m and a diameter 2R=6500 $\mu$m. The electrode plate 2 is suspended on three radial beams 1, placed symmetrically at 120° apart. The beams 1 act as springs yielding elastically in the vertical direction. The other ends of the beams 1 are connected to a silicon substrate 4, of which in the diagram is shown only a small portion to make the details of the structure easier to apprehend. In the exemplifying embodiment, the length of the beam 1 is l=8600 $\mu$m and its width w=300 $\mu$m. The lower electrode 15 has a diameter of 6500 $\mu$m. The distance between the electrodes 2 and 15 is d=10 $\mu$m. The device can be fabricated by bonding a micromachined SOI (Silicon On Insulator) substrate on a glass plate 8. The structure of the lower electrode 15 is patterned on the glass plate 8 prior to the bonding step.

The mass m to be weighed is first placed on the plate 2. The gravitational force $F_g$=mg bends the three beams 1 acting as the suspension springs, but the shape of the plate 2 is deformed only minimally. The suspended plate sinks under the load by a distance z=mg/k that can be determined based on the spring constant k=3$k_{beam}$ where $k_{beam}$=Et³w/4l³ is the spring constant of a single beam 1 and E=170 GPa is the Young's modulus of silicon. Using the above-cited numerical values, the plate displacement is calculated to be z=1 $\mu$m when g=9.8 m/s² and m=1 g.

In FIG. 1b, from bottom to top, the sensor structure according to the invention shown therein is comprised of a glass carrier 8 having the bottom electrode 15 of the sensor patterned on its upper surface. On the upper surface of the glass carrier 8 is next bonded a structure comprised of a silicon layer 7 defining the capacitor gap, a silicon dioxide layer 6 formed thereon as an insulating layer, and finally on top of the latter, a silicon layer 5 having the beams 1 and the top electrode structure 2 formed thereto by silicon micromechanical methods.

Obviously the sensor size can be further reduced by redesigning the shape of the suspension beams 1 or using a SOI substrate combined with a slightly thinner silicon layer.

As shown in FIG. 1c, the bottom electrode 15 may be divided into three parts, whereby a force balance structure can be implemented offering separate position control for each of the springed sectors individually and, thereby, a highly improved horizontal levelling of the top electrode 2. The external contacts to the electrodes 15 and a guard electrode 11 are passed via contact pad areas 10. For improved levelling of the top electrode 2, the number of individually driven bottom electrodes can be two or more. At least three individually driven electrodes are required to prevent the rotation of the top electrode in regard to both the x- and y-axes. Two electrodes are sufficient for preventing rotation about one axis.

Now referring to FIG. 2, the function of the weight sensor according to the invention in a force balance situation is as follows. Initially, the weight sensor 26 having no mass placed thereon is loaded with an electrostatic force $$F_e = \frac{\varepsilon A}{2(d-z)^2} U^2, \quad (1)$$

where $\varepsilon$ is the permittivity of air, A is the surface area of the weight sensor plate 26 and U is the voltage applied between the plate and the measurement electrode. The interelectrode displacement $z=Z_b$ can be solved from equation $F_e = kz$, whereby the own mass of the plate can be neglected. The value U is obtained when the measurement circuit formed by a tuned AC bridge is balanced. The AC bridge includes an AC signal source 20 feeding the bridge. The bridge itself includes a reference branch made from maximally stable components, whereby the first branch of the bridge is formed, e.g., from resistive or inductive components 22 and 23 connected in series, while the other branch that is connected in parallel with said first branch may include the capacitive components formed by $C_{ref}$ together with the capacitive weight sensor structure 26 in a series connection. The balance of the bridge is detected by a differential circuit 24. The differential circuit 24 is connected between the center points of said first and said second branch of the bridge. Next, the mass to be weighed is placed on the plate, simultaneously keeping the vertical position of the plate unchanged by means of a feedback circuit 21. The increased gravitational force is compensated for by adding a negative feedback voltage $U_f$ at a summing point 25 to the plate biasing voltage $U_{bias}$ in order to impose a small positive voltage $U = U_{bias} - U_f$ over the electrodes. The equation of force balance can be written as $$mg - kz + \frac{\varepsilon A}{2(d-\varepsilon)^2} U^2 = 0. \quad (2)$$

The function of the force feedback loop and the measurement inaccuracy of the feedback voltage $U_f$ determine the ultimate sensitivity of the weight sensor. Eq. 2 can be solved for sensor sensitivity $$\left(\frac{\Delta m}{m}\right)^2 = 2(2 - 2\alpha^{-1} + \alpha^{-2})\left(\frac{\Delta C}{C}\right)^2 + 4\left(\frac{\Delta U}{U}\right)^2,$$

where $\alpha = z_b/(d-z_b)$ is the relative electrode displacement, $U=U(0)$ is the feedback voltage of an unloaded weight sensor and C is the sensor capacitance at the operating point $z=z_b$. The feedback voltage $U(m)$ of a loaded weight sensor has no effect on the value of $\Delta m$ as long as $0<U(m)<<U(0)$ which is the case in practice. Parameter $\alpha$ represents the relative displacement of the movable electrode at the operating point. The plate position uncertainty related to the force feedback can be minimized by maximizing the value of $\alpha$. The maximum value max $\{\alpha\}=1/2$ is attained at a critical point $z_b=d/3$, where the feedback voltage pulls in the electrodes against each other. Assuming that $z_b=0,25d$, $\Delta U/U=1,6 \cdot 10^{-7}$, $\Delta C/C=10^{-7}$, the sensitivity is $\Delta m/m=4$, $5 \cdot 10^{-7}$. Suggested value of $\Delta U/U$ is possible when $U=U(0)=60$ V, as can be computed from Eq. 2. Respectively, suggested value of $\Delta C/C$ can be attained by using the latest capacitance measurement circuit by the inventors based on a tuned circuit, whereby cited value $\Delta C/C=10^{-7}$ is achieved using a measurement cycle duration of 0.1 s.

One possible source of systematic error can be attributed to a possible lateral shift of the mass being weighed aside from the center of the plate. Resultingly, the top electrode tilts thereby increasing the interelectrode capacitance. Such a lateral shift of the mass can be estimated to increase the interelectrode capacitance by $\Delta C/C=9.7 \cdot 10^{-4} (x/R)^2$, where R=3.25 mm and x is the distance of the gravitational center from the plate center. To overcome this problem, the lower electrode is divided according to the invention into three parts as shown in FIG. 1c. Then, three separate feedback circuits are capable of keeping a constant interelectrode capacitance between each electrode sector and the common top electrode so that the plate will not tilt if the mass being weighed is moved aside from the plate center.

The exemplifying embodiment of the weight sensor has a mechanical resonant frequency $f_r = \sqrt{k/m}/(2\pi)=430$ Hz when m=1 g. Hence, low-frequency vibrations are not readily transmitted into the structure. The use of a fast feedback circuit further helps reduce the effect of disturbing vibrations. The nonlinearity of the spring constant is irrelevant, because the force feedback keeps the electrodes at a constant displacement. Certain sources of error can be associated with variations in the moisture content, temperature and pressure of the ambient air. These problems may be overcome using more advanced embodiments in which the sensor chip is equipped with a reference capacitor $C_{ref}$ serving compensation measurements. Local changes in the gravity may also affect the sensor accuracy.

Without departing from the scope and spirit of the invention, the conducting electrode formed by the separate electrode areas can be made to serve the function of the movable electrode 2 as well as that of the fixed electrode 15.

What is claimed is:

1. A silicon micromechanical weight sensor comprising:
   a first conducting electrode;
   a second conducting electrode displaced at a distance from said first conducting electrode;
   a plurality of suspension means elastically suspending said first conducting electrode;
   a pan surface for receiving an object to be weighed and applying weight to said first conducting electrode;
   means for maintaining a constant distance between said first conducting electrode and said second conducting electrode by applying an electrical signal thereto and generating a weight signal based on the applied signal;
   at least one of said first conducting electrode and said second conducting electrode being divided into a plurality of partial areas so that said electrical signal for maintaining a constant distance is applied to each partial area separately in order to maintain said first and second conducting electrodes in a parallel arrangement.

2. The silicon micromechanical weight sensor according to claim 1, wherein said means for maintaining a constant distance includes means for detecting the distance between said first and second conducting electrodes.

3. The silicon micromechanical weight sensor according to claim 1, wherein said first conducting electrode and said second conducting electrode are essentially planar.

4. The silicon micromechanical weight sensor according to claim 1, wherein said means for maintaining said constant distance includes a tuned AC bridge with an AC signal source feeding the bridge, a differential circuit detecting the balance of the bridge, a first branch being formed from stable components, another branch including capacitive components, an output from the differential circuit being applied to a summing point to impose a voltage between the electrodes and generating a feedback voltage indicative of the measured weight.

5. The silicon miromechanical weight sensor according to claim 4, wherein the capacitive components include fixed capacitive components and a capacitor formed by said first conducting electrode and said second conducting electrode.

6. The silicon micromechanical weight sensor according to claim 1, wherein said second conducting electrode is fixed.

7. The silicon micromechanical weight sensor according to claim 1, wherein said plurality of partial areas form radial sectors.

* * * * *